US009864256B2

(12) United States Patent
Hyun et al.

(10) Patent No.: US 9,864,256 B2
(45) Date of Patent: Jan. 9, 2018

(54) OPTICAL MEMBER, DISPLAY DEVICE INCLUDING THE SAME, AND METHOD FOR MANUFACTURING THE SAME

(75) Inventors: Soon Young Hyun, Seoul (KR); June Roh, Seoul (KR); Kyung Jin Kim, Seoul (KR); Jae Hong Lee, Seoul (KR); Ja Ram Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 357 days.

(21) Appl. No.: 13/980,999

(22) PCT Filed: Nov. 30, 2011

(86) PCT No.: PCT/KR2011/009233
§ 371 (c)(1),
(2), (4) Date: Oct. 14, 2013

(87) PCT Pub. No.: WO2012/099332
PCT Pub. Date: Jul. 26, 2012

(65) Prior Publication Data
US 2014/0029299 A1    Jan. 30, 2014

(30) Foreign Application Priority Data
Jan. 21, 2011    (KR) .......... 10-2011-0006526

(51) Int. Cl.
*F21V 7/04*    (2006.01)
*G02F 1/35*    (2006.01)
(Continued)

(52) U.S. Cl.
CPC ............ *G02F 1/353* (2013.01); *G02B 6/0011* (2013.01); *G02F 1/133615* (2013.01);
(Continued)

(58) Field of Classification Search
CPC . G02B 6/0026; F21V 9/08; F21V 9/16; F21V 9/10; F21V 9/12; G02F 1/133617;
(Continued)

(56) References Cited

U.S. PATENT DOCUMENTS 6,637,905 B1 * 10/2003 Ng et al. .................. 362/601
7,036,946 B1 *  5/2006 Mosier ............ G02F 1/133617
                                                    349/68
(Continued)

FOREIGN PATENT DOCUMENTS

KR   10-2009-0021912 A       3/2009
KR      20090021912 A    *   4/2009
KR   10-2010-0046698 A       5/2010

OTHER PUBLICATIONS

Park Ki Duck, Backlight unit and liquid crystal display device having the same, Mar. 4, 2009, English translation.*
(Continued)

*Primary Examiner* — Bryon T Gyllstrom
*Assistant Examiner* — James Endo
(74) *Attorney, Agent, or Firm* — Saliwanchik, Lloyd & Eisenschenk

(57) ABSTRACT

A display device is provided and has an optical member, the optical member including: a host, a plurality of light conversion particles distributed in the host to convert a wavelength of light generated from a light source, and a protective layer surrounding the host and including plastic.

20 Claims, 4 Drawing Sheets

(51) Int. Cl.
*F21V 8/00* (2006.01)
*F21V 9/16* (2006.01)
*G02F 1/1335* (2006.01)

(52) U.S. Cl.
CPC .......... *G02F 1/133617* (2013.01); *F21V 9/16* (2013.01); *G02B 6/0026* (2013.01); *G02F 2001/133614* (2013.01)

(58) Field of Classification Search
CPC .... G02F 1/133621; G02F 2001/133614; F02F 2001/133614
USPC ............................ 362/601, 606, 607, 608, 84
See application file for complete search history.

(56) References Cited

U.S. PATENT DOCUMENTS

| | | | |
|---|---|---|---|
| 7,819,539 B2 | 4/2010 | Kim et al. | |
| 7,859,175 B2* | 12/2010 | Kurihara | H05B 33/145 |
| | | | 313/110 |
| 7,887,206 B2* | 2/2011 | Lee | G02B 6/0023 |
| | | | 362/608 |
| 2007/0004065 A1* | 1/2007 | Schardt et al. | 438/26 |
| 2007/0007892 A1* | 1/2007 | Shapiro | H05B 33/22 |
| | | | 313/511 |
| 2007/0210326 A1* | 9/2007 | Kurihara | G02B 6/005 |
| | | | 257/98 |
| 2007/0257597 A1* | 11/2007 | Sakata | C04B 35/117 |
| | | | 313/483 |
| 2008/0048200 A1* | 2/2008 | Mueller et al. | 257/98 |
| 2008/0111145 A1* | 5/2008 | Lin | 257/98 |
| 2009/0295265 A1* | 12/2009 | Tabuchi et al. | 313/112 |
| 2010/0051898 A1* | 3/2010 | Kim et al. | 257/9 |
| 2010/0148193 A1* | 6/2010 | Duong et al. | 257/88 |
| 2010/0155749 A1* | 6/2010 | Chen | C09K 11/025 |
| | | | 257/89 |
| 2010/0232133 A1* | 9/2010 | Tran et al. | 362/84 |
| 2010/0232134 A1* | 9/2010 | Tran | 362/84 |
| 2010/0264448 A1* | 10/2010 | Choi et al. | 257/98 |
| 2010/0291313 A1* | 11/2010 | Ling | C09K 11/02 |
| | | | 427/475 |
| 2011/0002140 A1* | 1/2011 | Tsukahara | G02B 5/0236 |
| | | | 362/602 |
| 2011/0037926 A1* | 2/2011 | Tsukahara | G02B 6/0023 |
| | | | 349/64 |
| 2011/0291548 A1* | 12/2011 | Nguyen et al. | 313/501 |
| 2011/0309325 A1* | 12/2011 | Park | H01L 25/0753 |
| | | | 257/13 |
| 2012/0074837 A1* | 3/2012 | Hwu | G02B 27/0955 |
| | | | 313/501 |

OTHER PUBLICATIONS

International Search Report in International Application No. PCT/KR2011/009233, filed Nov. 30, 2011.

* cited by examiner

[Fig. 1]
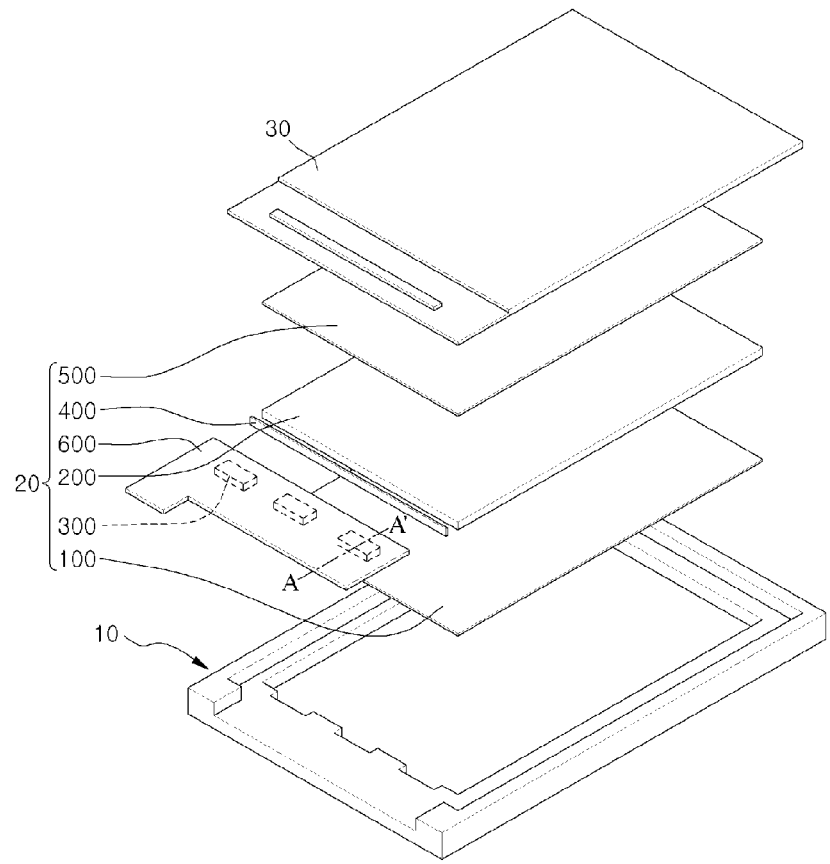
[Fig. 2]
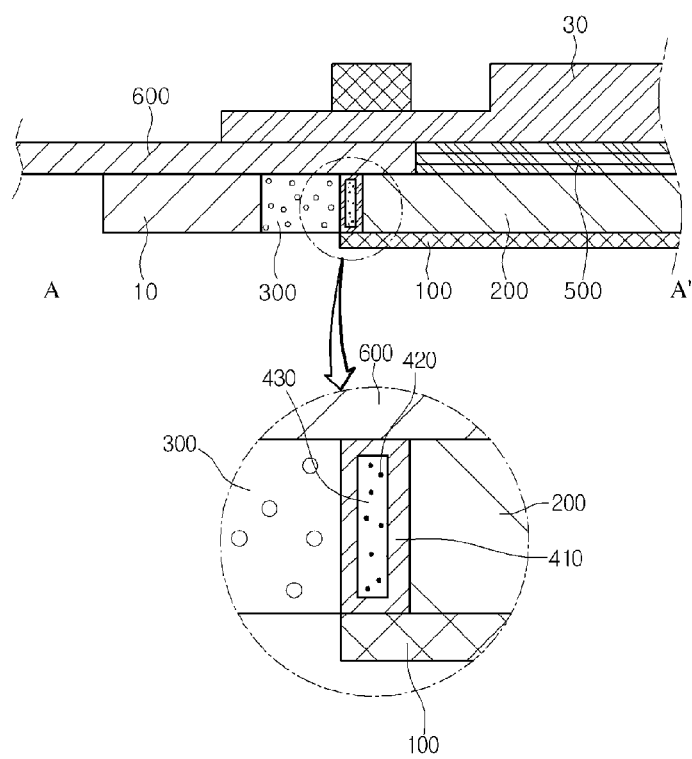

[Fig. 3]
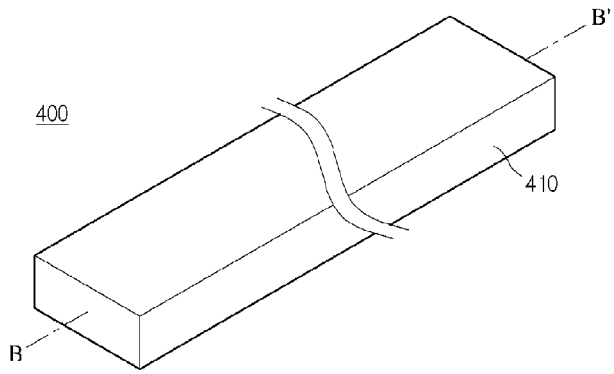
[Fig. 4]
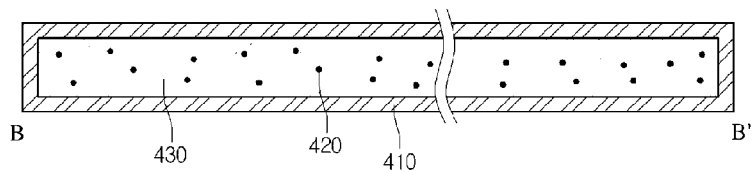
[Fig. 5]
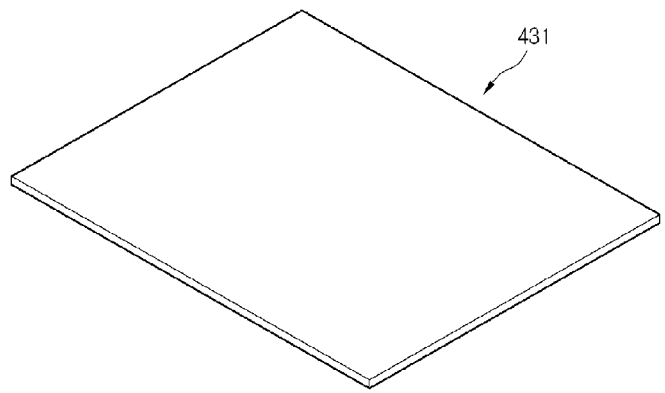
[Fig. 6]
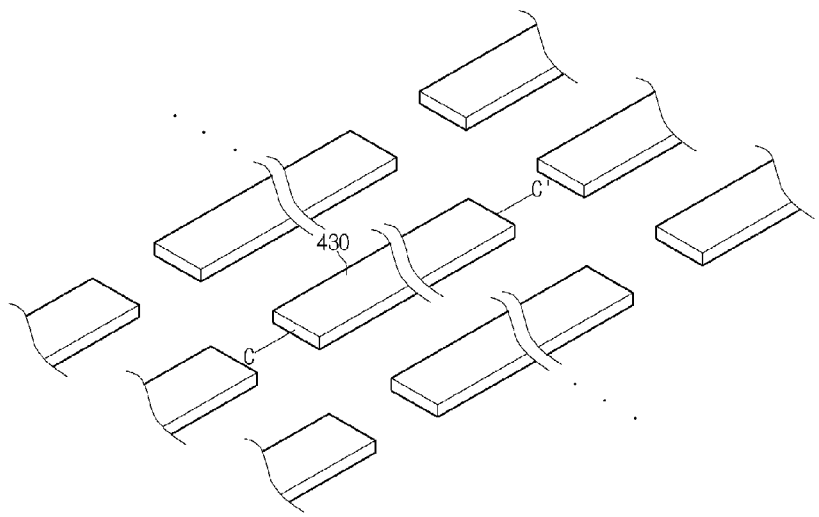

[Fig. 7]
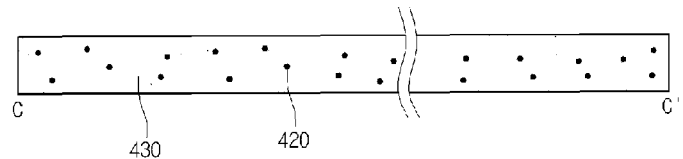
[Fig. 8]
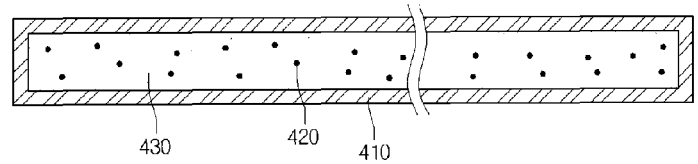
[Fig. 9]
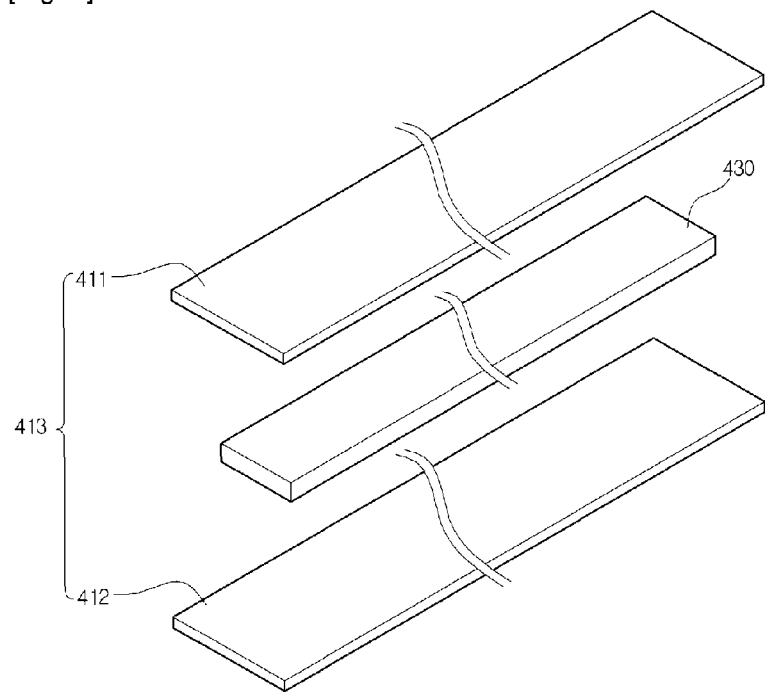
[Fig. 10]
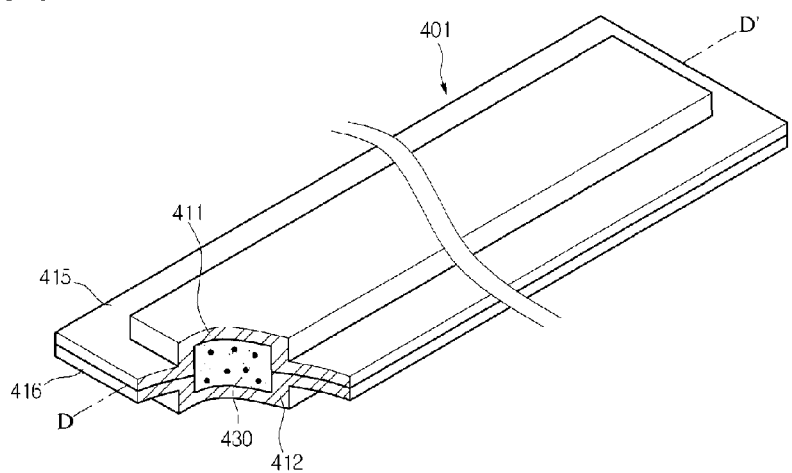

[Fig. 11]
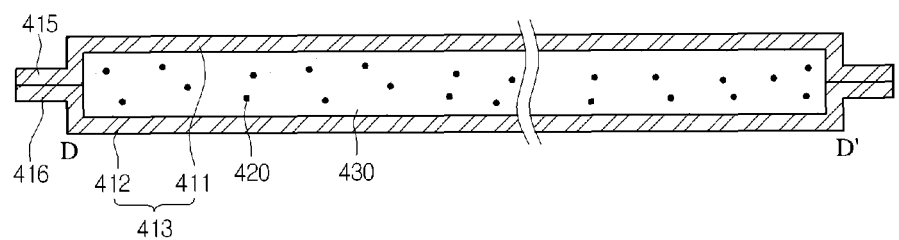
[Fig. 12]
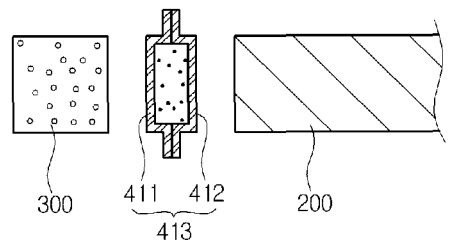

OPTICAL MEMBER, DISPLAY DEVICE INCLUDING THE SAME, AND METHOD FOR MANUFACTURING THE SAME

CROSS-REFERENCE TO RELATED APPLICATIONS

This application is the U.S. national stage application of International Patent Application No. PCT/KR2011/009233, filed Nov. 30, 2011, which claims priority to Korean Application No. 10-2011-0006526, filed Jan. 21, 2011, the disclosures of each of which are incorporated herein by reference in their entirety.

TECHNICAL FIELD

The embodiment relates to an optical member, a display device including the same and a method for manufacturing the same.

BACKGROUND ART

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed and the mixed light is incident into the light guide plate, thereby generating white light.

If the white light is supplied to the light guide plate by using the quantum dot bar, high color reproduction may be realized.

The backlight unit may include an FPCB (flexible printed circuit board) provided at one side of the blue LED to supply signals and power to the LEDs and a bonding member formed under the bottom surface of the FPCB.

The display device capable of displaying various images using the white light supplied to the light guide plate through the quantum dot bar as the blue light is emitted from the blue LED has been extensively used.

DISCLOSURE OF INVENTION

Technical Problem

The embodiment provides an optical member having an improved optical characteristic, a display device including the same and a method for manufacturing the same.

Solution to Problem

An optical member according to one embodiment includes a host; a plurality of light conversion particles distributed in the host to convert a wavelength of an incident light; and a protective layer surrounding the host and including polymer.

A display device according to one embodiment includes a light guide plate; a display panel on the light guide plate; a light source at a lateral side of the light guide plate; and a light conversion member between the light source and the light guide plate, wherein the light conversion member includes a host; a plurality of light conversion particles distributed in the host to convert a wavelength of an incident light; and a protective layer surrounding the host and including polymer.

A method for manufacturing an optical member according to one embodiment includes the steps of forming a sheet including a plurality of light conversion particles; forming a host by cutting the sheet; and forming a protective layer around the host.

Advantageous Effects of Invention

The optical member according to the embodiment includes the protective layer having plastic arranged around the host. The protective layer surrounds the host. Thus, the protective layer can effectively protect the light conversion particles distributed in the host from external moisture or oxygen.

In particular, since the protective layer includes the plastic, the protective layer can be coated on the outer surface of the host or can be formed through the lamination process for sandwiching the host. Therefore, the protective layer can completely seal the host against the outside.

Thus, the optical member according to the embodiment may have the improved durability and chemical-resistance property with high reliability.

In addition, since the protective layer includes the plastic, the optical member according to the embodiment may be flexible. Thus, the optical member according to the embodiment can be easily bonded to the light guide plate. In addition, the optical member according to the embodiment can be easily applied to the light guide plate even if the shape of the lateral side of the light guide plate is variously modified.

Further, the protective layer can be easily formed through the curing process or the lamination process. Thus, the optical member according to the embodiment can be easily manufactured.

BRIEF DESCRIPTION OF DRAWINGS

FIG. 1 is an exploded perspective view showing an LCD according to the first embodiment;

FIG. 2 is a sectional view taken along line A-A' of FIG. 1;

FIG. 3 is a perspective view of a light conversion member according to the first embodiment;

FIG. 4 is a sectional view taken along line B-B' of FIG. 3;

FIGS. 5 to 8 are views showing the procedure for manufacturing a light conversion member according to the first embodiment, in which FIG. 7 is a sectional view taken along line C-C' of FIG. 6;

FIGS. 9 and 10 are views showing the procedure for manufacturing a light conversion member according to the second embodiment;

FIG. 11 is a sectional view taken along line D-D' of FIG. 10; and

FIG. 12 is a sectional view showing a light source, a light conversion member and a light guide plate according to the second embodiment.

MODE FOR THE INVENTION

In the description of the embodiments, it will be understood that when a substrate, a frame, a sheet, a layer or a pattern is referred to as being on or under another substrate, another frame, another sheet, another layer, or another pattern, it can be directly or indirectly on the other substrate, frame, sheet, layer, or pattern, or one or more intervening layers may also be present. Such a position has been described with reference to the drawings. The thickness and size of each layer shown in the drawings may be exaggerated, omitted or schematically drawn for the purpose of convenience or clarity. In addition, the size of elements does not utterly reflect an actual size.

FIG. 1 is an exploded perspective view showing an LCD according to the first embodiment, FIG. 2 is a sectional view taken along line A-A' of FIG. 1, FIG. 3 is a perspective view of a light conversion member according to the first embodiment, FIG. 4 is a sectional view taken along line B-B' of FIG. 3 and FIGS. 5 to 8 are views showing the procedure for manufacturing the light conversion member.

Referring to FIGS. 1 to 4, the LCD according to the embodiment includes a mold frame 10, a backlight unit 20 and a liquid crystal panel 30.

The mold frame 10 receives the backlight assembly 20 and the liquid crystal panel 30 therein. The mold frame 10 has a rectangular frame shape and may include plastic or reinforced plastic.

In addition, a chassis may be disposed below the mold frame 10. The chassis surrounds the mold frame 10 and supports the backlight assembly 20. The chassis may also be disposed at a lateral side of the mold frame 10.

The backlight assembly 20 is disposed in the mold frame 10 to supply the light toward the liquid crystal panel 30. The backlight assembly 20 includes a reflective sheet 100, a light guide plate 200, light emitting diodes 300, a light conversion member 400, a plurality of optical sheets 500, and a flexible printed circuit board (FPCB) 600.

The reflective sheet 100 reflects the light upward as the light is generated from the light emitting diodes 300.

The light guide plate 200 is disposed on the reflective sheet 100. The light guide plate 200 guides the light upward by totally reflecting, refracting and scattering the light incident thereto from the light emitting diodes 300.

The light guide plate 200 includes an incident surface directed toward the light emitting diodes 300. From among lateral sides of the light guide plate 200, a lateral side directed toward the light emitting diodes 300 may serve as the incident surface.

The light emitting diodes 300 are disposed at the lateral side of the light guide plate 200. In detail, the light emitting diodes 300 are disposed at the incident surface.

The light emitting diodes 300 serve as a light source for generating the light. In detail, the light emitting diodes 300 emit the light toward the light conversion member 400.

The light emitting diodes 300 may include a blue light emitting diode generating the blue light or a UV light emitting diode generating the UV light. In detail, the light emitting diodes 300 can emit the blue light having the wavelength band of about 430 nm to about 470 nm or the UV light having the wavelength band of about 300 nm to about 400 nm.

The light emitting diodes 300 are mounted on the FPCB 600. The light emitting diodes 300 can be disposed under the FPCB 600. The light emitting diodes 300 are driven by receiving a driving signal through the FPCB 600.

The light conversion member 400 is interposed between the light emitting diodes 300 and the light guide plate 200. In detail, the light conversion member 400 is bonded to the lateral side of the light guide plate 200. In more detail, the light conversion member 400 is attached to the incident surface of the light guide plate 200. In addition, the light conversion member 400 can be bonded to the light emitting diodes 300.

The light conversion member 400 receives the light from the light emitting diodes 300 to convert the wavelength of the light. For instance, the light conversion member 400 can convert the blue light emitted from the light emitting diodes 300 into the green light and the red light. In detail, the light conversion member 400 converts a part of the blue light into the green light having the wavelength in the range of about 520 nm to about 560 nm, and a part of the blue light into the red light having the wavelength in the range of about 630 nm to about 660 nm.

In addition, the light conversion member 400 can convert the UV light emitted from the light emitting diodes 300 into the blue light, the green light and the red light. In detail, the light conversion member 400 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the light conversion member 400 and the lights converted by the light conversion member. In detail, the white light can be incident into the light guide plate 200 through the combination of the blue light, the green light and the red right.

As shown in FIGS. 3 and 4, the light conversion member 400 includes a protective layer 410, a plurality of light conversion particles 420, and a host 430.

The protective layer 410 receives the light conversion particles 420 and the host 430 therein. That is, the protective layer 410 may serve as a receptacle to receive the light conversion particles 420 and the host 430. In addition, the protective layer 410 extends in one direction.

The protective layer 410 surrounds the host 430. The protective layer 410 can be formed on the entire outer surface of the host 430. In addition, the protective layer 410 can be coated on the entire outer surface of the host 430.

That is, the protective layer 410 can be directly formed on the outer surface of the host 430.

The protective layer 410 may have a rectangular column shape. In detail, a section of the protective layer 410, which is vertical to the length direction of the protective layer 410, may have the rectangular shape.

The protective layer 410 may protect the host 430 and the light conversion particles 420. In detail, the protective layer 410 protects the light conversion particles 420 from external oxygen and moisture.

The protective layer 410 has high light transmittance. That is, the protective layer 410 is transparent. In addition, the protective layer 410 may have a dense structure. For instance, the protective layer 410 may include polymer, such as polyimide, polyethylene terephthalate, ethylene vinyl alcohol, polyvinyl chloride, olefin resin or phenol resin.

The protective layer 410 may further include a cross-linking agent to improve the sealing property. For instance, the cross-linking agent includes 1,6-Hexanediol Diacrylate, Dipropylene glycol Diacrylate, Neopentyl glycol Diacrylate, Trimethylolpropane Triacrylate, Ethoxylated Trimethylolpropane Triacrylate, Trimethylolpropane Trimethacrylate, Pentaerythritol Tetraacrylate, Dipentaerythritol Hexaacrylate, Vinyltriethoxysilane, Vinyltrimethoxysilane, Vinyl-tris-(2-methoxyethoxy) silane, or Vinylmethyldimethoxysilane.

In addition, the protective layer 410 may further include metal salt, such as platinum compound, to improve the sealing property.

The thickness of the protective layer 410 may be properly adjusted according to the sealing property and the light transmittance. For instance, the protective layer 410 may have the thickness in the range of about 50 to about 200.

The light conversion particles 420 are provided in the protective layer 410. In detail, the light conversion particles 420 are uniformly distributed on the outer surface of the host 440 or in the host 440 installed in the protective layer 410.

The light conversion particles 420 convert the wavelength of the light emitted from the light emitting diodes 300. In detail, the light is incident into the light conversion particles 420 from the light emitting diodes 300 and the light conversion particles 420 convert the wavelength of the incident light. For instance, the light conversion particles 420 can convert the blue light emitted from the light emitting diodes 300 into the green light and the red light. That is, a part of the light conversion particles 420 converts the blue light into the green light having the wavelength in the range of about 520 nm to about 560 nm and a part of the light conversion particles 420 converts the blue light into the red light having the wavelength in the range of about 630 nm to about 660 nm.

In addition, the light conversion particles 420 can convert the UV light emitted from the light emitting diodes 300 into the blue light, the green light and the red light. That is, a part of the light conversion particles 420 converts the UV light into the blue light having the wavelength in the range of about 430 nm to about 470 nm, and a part of the light conversion particles 420 converts the UV light into the green light having the wavelength in the range of about 520 nm to about 560 nm. Further, a part of the light conversion particles 420 converts the UV light into the red light having the wavelength in the range of about 630 nm to about 660 nm.

In other words, if the light emitting diodes 300 are blue light emitting diodes that emit the blue light, the light conversion particles 420 capable of converting the blue light into the green light and the red light may be employed. In addition, if the light emitting diodes 300 are UV light emitting diodes that emit the UV light, the light conversion particles 420 capable of converting the UV light into the blue light, the green light and the red light may be employed.

The light conversion particles 420 may include a plurality of quantum dots. The quantum dots may include core nano-crystals and shell nano-crystals surrounding the core nano-crystals. In addition, the quantum dots may include organic ligands bonded to the shell nano-crystals. Further, the quantum dots may include an organic coating layer surrounding the shell nano-crystals.

The shell nano-crystals can be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient higher than that of the general fluorescent pigment by 100 to 1000 times and has the superior quantum yield, so that strong fluorescent light can be generated.

The quantum dots can be synthesized through the chemical wet scheme. According to the chemical wet scheme, the particles are grown by immersing the precursor material in the organic solvent. The quantum dots can be synthesized through the chemical wet scheme.

The light conversion particles 420 are uniformly distributed in the host 430. In addition, the light conversion particles 420 can be distributed on the surface of the host 430. The host 430 may include polymer. The host 430 is transparent. That is, the host 430 includes transparent polymer. Silicon polymer can be used for the host 430.

As shown in FIGS. 5 to 8, the light conversion member 400 can be manufactured as follows.

Referring to FIG. 5, the light conversion particles 420 are uniformly distributed in a first resin composition including silicon polymer. Then, the first resin composition, in which the light conversion particles 420 are uniformly distributed, is cured in the form of a sheet so that a light conversion sheet 431 is formed.

At this time, a thickness of the light conversion sheet 431 can be properly adjusted by taking the density of the light conversion particles 420 and the transmittance of the light conversion sheet 431 into consideration. For instance, the light conversion sheet 431 may have the thickness of about 0.2 mm.

Referring to FIGS. 6 and 7, the light conversion sheet 431 can be divided into a plurality of hosts 430. The width and the length of the host 430 may correspond to the lateral side of the light guide plate 200. In detail, the host 430 may have the width of about 0.6 mm.

Referring to FIG. 8, a second resin composition including polyimide is coated on the outer surface of the host 430. The second resin composition can be coated on the entire surface of the host 430 through the spray scheme or the dipping scheme.

The second resin composition may include a cross-linking agent and metal salt, such as platinum compound. In addition, the second resin composition may include a photo curing initiator. For instance, the photo curing initiator may include -hydroxyketone, phenylglyoxylate, benzildimethyl ketal, -aminoketone, mono acyl phosphine, bis acyl phosphine, 2,2-dimethoxy-2-phenylacetophenone, or the mixture thereof.

Then, the second resin composition coated around the host 430 is cured by light and/or heat, so that the protective layer 410 is formed.

Since the host 430 and the protective layer 410 include the plastic, the light conversion member 400 may be flexible. That is, the host 430 and the protective layer 410 may be flexible.

In addition, if the protective layer 410 includes the polyimide, the protective layer 410 may have a weak yellow color. Thus, the intensity of the blue light emitted from the light emitting diodes 300 can be reinforced, so that the blue light can be corrected. That is, the intensity of the blue light can be reinforced to realize the natural white light.

Referring again to FIGS. 1 to 4, the optical sheets 500 are disposed on the light guide plate 200 to improve the characteristic of the light passing through the optical sheets 500.

The FPCB 600 is electrically connected to the light emitting diodes 300. The FPCB 600 can mount the light emitting diodes 300 thereon. The FPCB 600 is installed in the mold frame 10 and arranged on the light guide plate 200.

The mold frame 10 and the backlight assembly 20 constitute the backlight unit. That is, the backlight unit includes the mold frame 10 and the backlight assembly 20.

The liquid crystal panel 30 is installed in the mold frame 10 and arranged on the optical sheets 500.

The liquid crystal panel 30 displays images by adjusting intensity of the light passing through the liquid crystal panel 30. That is, the liquid crystal panel 30 is a display panel to display the images. The liquid crystal panel 30 displays the images by using the light having the wavelength converted by the light conversion member 400. The liquid crystal panel 30 includes a TFT substrate, a color filter substrate, a liquid crystal layer interposed between the above two substrates and polarizing filters.

In this manner, the protective layer 410 is coated on the outer surface of the host 430 and then cured, so the host 430 can be completely sealed against the outside. Thus, the light conversion member 400 according to the embodiment may have the improved durability and chemical-resistance property with high reliability.

The host 430 can be formed through the cutting process, and the protective layer 410 can be formed through the coating and curing processes. That is, a plurality of hosts 430 can be simultaneously formed by performing the cutting process with respect to the light conversion sheet 431. In addition, the hosts 430 can be simultaneously coated on the protective layer 410 through the coating and curing processes. Thus, the light conversion member 400 can be manufactured in mass-production.

In addition, since the light conversion member 400 is flexible, the light conversion member can be easily bonded to the light guide plate 200. In detail, the light conversion member 400 can be easily applied to the light guide plate 200 even if the shape of the lateral side of the light guide plate 200 is variously modified.

FIGS. 9 and 10 are views showing the procedure for manufacturing a light conversion member according to the second embodiment, FIG. 11 is a sectional view taken along line D-D' of FIG. 10, and FIG. 12 is a sectional view showing a light source, a light conversion member and a light guide plate according to the second embodiment. The description and the method for manufacturing the LCD and the light conversion member disclosed in the previous embodiment will be incorporated in the present embodiment as reference and the following description will be made while focusing on the features changed from the first embodiment.

Referring to FIG. 9, the host 430 is sandwiched between the first protective layer 411 and the second protective layer 412. At this time, the surface area of the first and second protective layer 411 and 412 may be larger than the surface area of the host 430.

Referring to FIGS. 10 and 11, the first and second protective layers 411 and 412 are laminated with each other. The first protective layer 411 covers the entire top surface of the host 430 and the second protective layer 412 covers the entire bottom surface of the host 430. That is, the first and second protective layers 411 and 412 may cover the whole area of the host 430.

In addition, the outer portion of the first protective layer 411 directly makes contact with the outer portion of the second protective layer 412. In detail, the first protective layer 411 includes a first bonding part 415 provided at the outer portion of the first protective layer 411 and the second protective layer 412 includes a second bonding part 416 provided at the outer portion of the second protective layer 412. The first bonding part 415 is bonded to the second protective layer 412. In detail, the first bonding part 415 directly makes contact with the second protective layer 412. In more detail, the first bonding part 415 directly makes contact with the second bonding part 416 so as to be bonded to the second bonding part 416. In addition, the second bonding part 416 is bonded to the first bonding part 415. In detail, the second bonding part 416 directly makes contact with the first bonding part 415 so as to be bonded to the first bonding part 415.

The first and second bonding parts 415 and 416 may have loop shapes. In detail, the first and second bonding parts 415 and 416 may have closed loop shapes. The first and second bonding parts 415 and 416 may extend along the lateral side of the host 430.

Thus, the first and second protective layers 411 and 412 may completely seal the host 430 against the outside. That is, the first and second protective layers 411 and 412 are bonded to each other along the outer peripheral portions thereof so that a sealing region is formed between the first and second protective layers 411 and 412. The host 430 is disposed in the sealing region.

In addition, the first protective layer 411 adheres to the outer surface of the host 430, and the second protective layer 412 adheres to the outer surface of the host 430. In this manner, the protective layer 410a including the first and second protective layers 411 and 412 is formed around the host 430 through the laminating process.

The first protective layer 411 may have the refractive index different from the refractive index of the second protective layer 412. That is, the refractive indexes of the first and second protective layers 411 and 412 and the host 430 may be properly set so that the light conversion member 401 may have the optimum transmittance.

For instance, the refractive index of the first protective layer 411 is high, the refractive index of the host 430 is intermediate, and the refractive index of the second protective layer 412 is low. In detail, the first and second protective layers 411 and 412 are formed separately from each other and subject to the laminating process, so the light conversion member 401 according to the present embodiment can be optically designed to have the high transmittance.

In addition, since the first and second protective layers 411 and 412 are formed separately from each other and then laminated to the host 430, the first and second protective layers 411 and 412 may have the desired sealing property and the transmittance.

That is, the first and second protective layers 411 and 412 can be formed regardless of the host 430, the thickness of the first and second protective layers 411 and 412 can be easily and uniformly adjusted.

As shown in FIG. 12, the light conversion member 401 according to the present embodiment can be interposed between the light emitting diodes 300 and the light guide plate 200. In this case, the first protective layer 411 is disposed between the light emitting diodes 300 and the host 430. In addition, the second protective layer 412 is disposed between the host 430 and the light guide plate 200.

In addition, the refractive index of the first protective layer 411 is in the range between the refractive index of the host 430 and the refractive index of the filling material of the light emitting diodes 300. In addition, a first adhesive layer (not shown) can be interposed between the first protective layer 411 and the filling material of the light emitting diodes 300. The first adhesive layer may adhere to the first protective layer 411 and the filling material of the light emitting diodes 300. The refractive index of the first adhesive layer is in the range between the refractive index of the filling material of the light emitting diodes 300 and the refractive index of the first protective layer 411. Thus, the transmittance between the light emitting diodes 300 and the host 430 can be improved.

In addition, the refractive index of the second protective layer 412 may be in the range between the refractive index of the host 430 and the refractive index of the light guide plate 200. In addition, a second adhesive layer (not shown) can be interposed between the second protective layer 412 and the light guide plate 200. The second adhesive layer may adhere to the second protective layer 412 and the light guide plate 200. The refractive index of the second adhesive layer is in the range between the refractive index of the light guide plate 200 and the refractive index of the second protective layer 412. Thus, the transmittance between the host 430 and the light guide plate 200 can be improved.

Thus, the light conversion member 401 according to the embodiment may have the improved durability and chemical-resistance property with high reliability. In addition, the LCD having the light conversion member 401 according to the embodiment may have the high brightness, that is, the improved optical characteristic.

Any reference in this specification to one embodiment, an embodiment, example embodiment, etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The LCD according to the embodiments can be used in the display field.

The invention claimed is:

1. A display device comprising:
 a frame;
 a backlight assembly on the frame; and
 a display panel on the backlight assembly;
 wherein the backlight assembly comprises:
  a reflective sheet;
  a light guide plate on the reflective sheet;
  a light source disposed at a lateral side of the light guide plate; and
  a light conversion member between the light source and the light guide plate,
 wherein the light conversion member comprises:
  a host;
  a plurality of light conversion particles dispersed in the host to convert a wavelength of light generated from the light source; and
  a protective layer surrounding the host and including plastic;
 wherein the light conversion particles comprise quantum dots,
 wherein the protective layer is in contact with a surface of the host,
 wherein the protective layer includes:
  a first lateral protective layer that faces the light source;
  a second lateral protective layer that faces the light guide plate;
  a top protective layer extended from the first lateral protective layer and the second lateral protective layer; and a bottom protective layer extended from the first lateral protective layer to and the second lateral protective layer;
wherein the host is interposed between the first lateral protective layer and the second lateral protective layer,
wherein the host is interposed between the top protective layer and the bottom protective layer;
wherein a refractive index of the first lateral protective layer is higher than a refractive index of the host, and a refractive index of the second lateral protective layer is lower than the refractive index of the host;
wherein the protective layer extends continuously along the lateral side of the light guide plate, and
wherein the light source includes a plurality of blue LEDs and the plurality of blue LEDs is disposed along the lateral side of the light guide plate.

2. The display device of claim 1, wherein the light conversion member has a yellow color.

3. The display device of claim 1, wherein a sealed region is formed by the first lateral protective layer, the second lateral protective layer, the top protective layer, and the bottom protective layer,
and the host is disposed in the sealed region.

4. The display device of claim 1, wherein the protective layer includes polyimide.

5. The display device of claim 1, wherein the host and the protective layer are flexible.

6. The display device of claim 1, wherein the first lateral protective layer, the second lateral protective layer, the top protective layer, and the bottom protective layer are disposed on an entire surface of the host.

7. The display device of claim 1, wherein the protective layer is transparent.

8. The display device of claim 1, wherein the protective layer has a thickness in a range of about 50 μm to about 200 μm.

9. The display device of claim 1, further comprising a flexible printed circuit board (FPCB) comprising a bottom surface on which the light source is mounted.

10. The display device of claim 9, wherein the light conversion member extends continuously along the bottom surface of the FPCB.

11. The display device of claim 10, wherein a width of the light conversion member is the same as that of the bottom surface of the FPCB.

12. The display device of claim 11, wherein a width of the light conversion member is the same as that of the lateral side of the light guide plate.

13. The display device of claim 12, wherein the frame comprises a hole in a center portion thereof, and wherein at least a portion of the backlight assembly is disposed in the hole of the frame.

14. The display device of claim 13, further comprising a plurality of optical sheets between the display panel and the backlight assembly.

15. The display device of claim 14, wherein the light conversion member further comprises a first bonding part and a second bonding part in direct physical contact with the protective layer and with each other,
wherein the first and second bonding parts seal the host within the protective layer.

16. The display device of claim 15, wherein a thickness of the first lateral protective layer where the first and second bonding parts are absent is less than a sum of a thickness of the first bonding part and a thickness of the top protective layer where the first bonding part is formed.

17. The display device of claim 1, wherein the frame comprises a hole in a center portion thereof, and wherein at least a portion of the backlight assembly is disposed in the hole of the frame.

18. The display device of claim 1, further comprising a plurality of optical sheets between the display panel and the backlight assembly.

19. The display device of claim 1, wherein the light conversion member further comprises a first bonding part and a second bonding part in direct physical contact with the protective layer and with each other,
wherein the first and second bonding parts seal the host within the protective layer.

20. The display device of claim 19, wherein a thickness of the first lateral protective layer where the first and second bonding parts are absent is less than a sum of a thickness of the first bonding part and a thickness of the top protective layer where the first bonding part is formed.

* * * * *